United States Patent Office 3,534,143
Patented Oct. 13, 1970

3,534,143
COMPUTER CONTROL OF METAL TREATMENT FURNACE OPERATION
Norman R. Carlson, Export, and Raymond L. Zahradnik, Murrysville, Pa., assignors to Westinghouse Electric Corporation, Pittsburgh, Pa., a corporation of Pennsylvania
Filed Oct. 25, 1968, Ser. No. 770,486
Int. Cl. F27d 19/00
U.S. Cl. 13—1         5 Claims

ABSTRACT OF THE DISCLOSURE

For the control of a metal treatment arc furnace or a basic oxygen furnace, such as is commonly used for refining steel, a controlled removal of carbon and other elements is effected by a closed looped feedback computer control applied for periodic intervals to monitor the carbon removal efficiency in relation to carbon removal and oxygen consumption within the furnace for controlling any additional oxygen supplied to the furnace as well as to provide a desired temperature control of the metal bath within the furnace.

BACKGROUND OF THE INVENTION

At the present time many arc furnaces in particular are operated in two phases. In the first phase the electric arc is active and the metal charge within the furnace is melted. In a second phase the electric arc within the furnace is inactive, and an oxygen jet is employed to refine the molten metal bath within the furnace. The length of the oxygen blow is adjusted so the bath carbon content at the end of the oxygen blow period is within desired and acceptable limits.

The control of an electric arc furnace by a programmed digital computer is commonly utilized for the purpose of controlling the electrical power demand of the furnace in a plant in relation to other such furnaces.

In the operation of an electrical arc furnace during the oxygen blow period, as compared to the oxygen blow period of a basic oxygen furnace, the oxygen flow rates are substantially lower such that it is feasible to reach into the furnace during the oxygen blow period and extract a sample of the metal by a well-known spooning technique. The reaction taking place within a basic oxygen furnace involves a substantially higher oxygen flow rate such that it is much more difficult to physically extract a sample of the molten metal within the furnace during the oxygen blow period, however, secondary lance devices are in use for this purpose. An electric arc furnace usually requires between two and three hours of active electric arc to melt the scrap initially placed within the furnace; the arc furnace then enters into the refining period, during which the electric arc is inactive and oxygen flows through a jet for reaction with the metal at the rate of 100 to 200 cubic feet a minute (as opposed to a basic oxygen furnace flow rate of 20,000 to 25,000 cubic feet a minute) and the oxygen flow period lasts for thirty minutes or more.

SUMMARY OF THE PRESENT INVENTION

The present invention employs a programmed digital computer for the purpose of better controlling the carbon content and the temperature of the metal bath within a metal treatment furnace. This is done by sensing the temperature and the carbon content within the metal bath at periodic intervals and determining the efficiency of the lance oxygen in the removal of carbon from the bath during each of said intervals. As compared to a basic oxygen furnace where the oxygen lance is positioned a predetermined distance above the bath, in an electric arc furnace the oxygen lance is submerged a predetermined distance below the upper surface of the metal bath, such as one or two feet below the slag layer, and the degree to which the lance is submerged as well as the angle of the lance, such as 35 degrees from the horizontal, are in part determinative of the effective carbon removal as the oxygen flow reacts with the metal bath. The computer control is operative with an associated metal analysis device, such as a spectrograph, which together with the customary spoon sampling of the metal bath at periodic intervals allows a periodic analysis to be made of the effective carbon removal from the bath and in this manner the periodic carbon removal efficiency can be determined. The computer is operative to retain in its memory readings of the lance oxygen flow rate, and thus the time integrated lance oxygen, for computing at regular time intervals in relation to measured carbon removal the efficiency of the oxygen in removing the carbon from the metal bath. In this manner, and knowing what the carbon content of the metal bath is at the end of each periodic time interval, on the basis of the current carbon removal efficiency the computer can determine how many more minutes of oxygen flow at a determined flow rate is required for the bath carbon content to reach a target and desired value.

It is an object of the present invention to provide an improved control for a metal treatment furnace which includes a programmed control computer for better monitoring the carbon content of the metal bath within the furnace for determining the carbon removal efficiency and for better monitoring the temperature of the metal bath within the furnace in conjunction with the spectrograph or similar analysis device operative with metal samples removed at periodic time intervals from the bath.

In the case of an electric arc furnace, it is a further object of the present invention to improve the control of scrap or other material additions made to the arc furnace, with the ladle additions and the occurrence of same being determined by the control computer in accordance with the monitored current state of operation of the metal treatment taking place within the furnace, to obtain an improved control of the metal treatment and particularly the carbon content within the furnace without the necessity of waste gas analysis.

It is an object of the present invention to provide an improved control system for a metal treatment furnace for the purpose of arriving more accurately at a predetermined metal chemistry in relation to carbon content and temperature of the metal bath within the furnace.

DESCRIPTION OF THE PREFERRED EMBODIMENT

Figure 1:
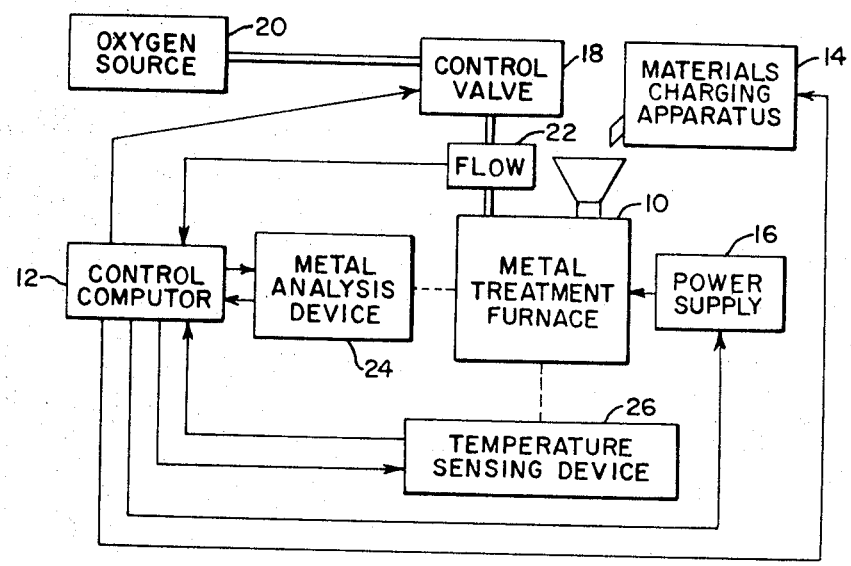
FIG. 1 shows one form of the provided computer control for a metal treatment furnace.

In FIG. 1 there is shown a metal treatment furnace 10 which, for purposes of example, is considered to be an electric arc furnace. A control computer 12 is operative to control a suitable materials charging apparatus 14 for initially placing a charge of scrap or other material within the metal treatment furnace, and for periodically adding to this charge of material within the furnace as desired. When the metal treatment furnace 10 contains a predetermined charge of material to be melted down, the control computer 12 energizes a power supply 16 for initiating the electric arc within the metal treatment furnace 10 for the melt-down period which may take two or three hours of time. The present invention is more concerned with the refining period within the metal treatment furnace 10, and, therefore, after the material has been properly charged and melted down within the metal treatment furnace, a predetermined metal bath is contained within that furnace of liquid metal and it is at this time that the control computer 12 opens a control valve 18 operative with an oxygen source 20 to begin the flow of oxygen through a lance operative with the metal bath as well known to persons skilled in this particular art. An oxygen flow transducer 22 is operative with the control computer for monitoring the flow of oxygen through the lance for the treatment of the metal bath within the metal treatment furnace 10. At periodic time intervals determined by the control computer 12, a metal analysis device 24 is caused to remove or isolate a sample of the metal within the molten bath of the metal treatment furnace 10 and to supply to the control computer 12 information in accordance with the carbon content of the metal sample taken from within the metal treatment furnace 10. At generally similar time intervals the control computer 12 causes the temperature sensing device 26, which may be included as part of and operate in conjunction with the metal analysis device 24, to provide a reading of the temperature of the liquid metal within the metal treatment furnace 10.

After the initial melt-down period when the metal within the furnace is melted and is probably at a temperature of 2300° F. or so, the control computer 12 indicates to an operator or causes the metal analysis device 24 to sample the metal bath within the metal treatment furnace 10. The sample can be removed by the well-known spooning technique at the end of each periodic time interval and sent to the associated analysis laboratory to find out what the chemistry of the metal within the furnace is. A determination is then made by the control computer 12 about how to proceed with the oxygen blow at the known rate of 2000 cubic feet a minute or so as sensed by flow transduced 22 to oxidize the remaining carbon, contaminants and undesired materials out of the metal bath. The carbon especially has to be oxidized down to its target value and this will eliminate silicon, help control the phosphors and so on. After each scheduled periodic time interval, another metal sample is taken to determine if the target carbon level has been approached as predicted or is reached. If too much carbon remains, the oxygen blow is continued; if too little carbon is present the molten bath is recarburized. The temperature of the metal within the arc furnace at the end of the oxygen blow, as sensed by any one of several presently available devices, is not a great problem because the arc itself can be used to raise the temperature if the temperature of the molten bath at the end of the last periodic time interval is low.

Figure 2:
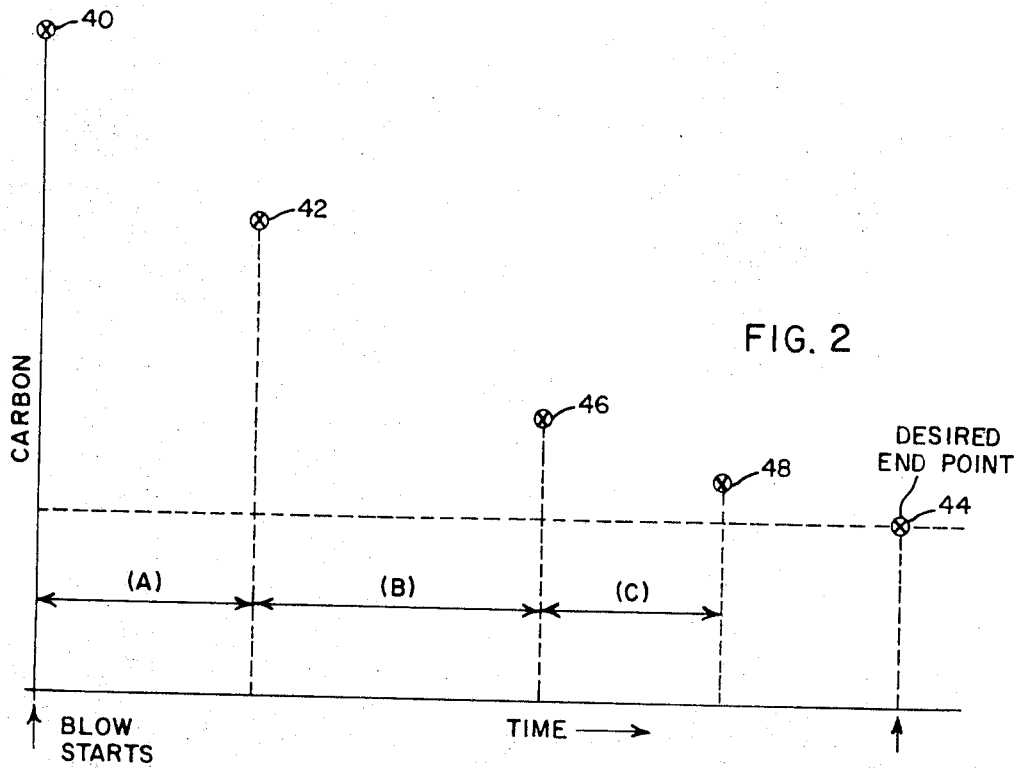
FIG. 2 illustrates the obtained carbon removal as a function of time that takes place within the metal bath in the metal treatment furnace.

As shown in FIG. 2 the metal treatment control of the present invention requires the sampling of the metal bath within the furnace once before the oxygen blow is initiated, and a predetermined or scheduled number of times during the blow period. Sampling of the metal bath during the blow is more readily accomplished in an electric arc furnace, as compared to the basic oxygen furnace, in that the agitation of the metal bath within the electric arc furnace is not as violent. The carbon content of each sample taken at the end of each periodic time interval can be analyzed by means of any suitable and well-known carbon analyzer, such as a spectrograph device. The control computer 12 monitors and integrates the oxygen flow rate and stores this information each time a bath sample is taken at the end of each periodic time interval, and the carbon content of the sample that is analyzed is also stored. As shown in FIG. 2 multiple bath samples are analyzed in relation to the integrated oxygen flow. Before the oxygen blow is initiated, the metal bath is sampled and analyzed for carbon content as shown at point 40. After a predetermined time interval determined by the integrated oxygen flow, such as 10,000 cubic feet of oxygen, the control computer 12 requests another bath sample and a carbon content reading is taken for same as shown at point 42. When this bath sample is taken the furnace operator can push an interrupt button, and the computer 12 records the integrated oxygen flow which at this time is 10,000 cubic feet of oxygen. The metal sample is analyzed and the analyzed carbon content as shown at point 42 is entered into the computer memory. The computer 12 then calculates the number of carbon points eliminated per standard cubic foot of oxygen, which is the carbon removal efficiency for the first periodic time interval A as shown in FIG. 2. With this information, and with the knowledge of the carbon point difference between point 42 and the desired end point 44, the computer 12 calculates and displays for the operator the amount of oxygen remaining to be blown. The control computer 12, knowing the flow rate, determines an appropriate time fraction of approximately ½ which is the indicated periodic time interval B for this amount of oxygen to be blown before the computer requests a metal sample and obtains a reading of the carbon content at point 46. The computer then determines the integrated oxygen flow rate between point 42 and point 46, and uses this to calculate the points of carbon removed per cubic foot of oxygen which is the carbon removal efficiency for the periodic time interval B. With this information, and with the carbon point difference known between point 46 and the desired end point 44, the computer 12 recalculates and displays the oxygen remaining to be blown. After another periodic time interval of approximately ½, or time interval C, of this new amount of oxygen to be blown, the computer 12 again calls for a sample to be taken and obtains a carbon content reading at point 48. The carbon removal efficiency for the time interval C is now calculated and the remaining time interval requirement for the oxygen flow is displayed. When this amount of oxygen flow has elapsed, the computer 12 terminates the blow by closing the control valve 18 with the bath carbon content at end point 44.

It is within the scope of the present invention to store a past experience history table of oxygen carbon removal efficiencies as a function of flow rate within the memory of the computer 12 in relation to a given electric arc metal treatment furnace, and to update this stored information to provide a current and operational trend for determining the improved control of the metal treatment furnace. Such a table would enable the establishment of an optimum oxygen flow rate and an optimum lance depth within the metal bath to be determined. The control computer 12 can be coupled to determine the operation of the control valve 18 for determining the oxygen flow through the lance, as well as to a position control device for adjusting the relative angle of the lance and the depth of the lance within the metal bath. The computer 12 is operative to read any associated spectrograph and convert the results into a chemical analysis of the metal bath, as well as determine the periodic time intervals for taking the samples of the metallic bath within the furnace.

Thusly, it is seen that the computer 12 is operative to monitor the amount of oxygen that has been blown into the furnace during any given periodic time interval between the taking of any two metal samples from the furnace and to determine the reduction of carbon which took place in that interval of time to compute a new carbon removal efficiency for the same time interval and to use this newly determined carbon removal efficiency in conjunction with a knowledge of how much carbon is left within the metal bath to anticipate how much longer at a known flow rate the oxygen should be blown into the furnace through the lance. Each time a metal sample is taken and the carbon content of the metal bath determined, the oxygen flow schedule can be updated by the computer and the more frequently such a metal bath sampling is taken, the better the resulting furnace operation control is obtained such that at least three or four such metal bath samplings should be practicable within the oxygen blow period of a given metal furnace through the monitoring operation of the control computer 12.

When the oxygen flow through the lance is started, the computer could, after the initial and first metal sample, wait ten or fifteen minutes before a second metal sample and carbon analysis is made. Then a third metal sample could be taken after about ten minutes for another determination of carbon content and carbon removal efficiency. A fourth metal sample could be taken after five to seven minutes for the carbon determination and carbon removal efficiency at that time determining that a predetermined terminal amount of oxygen, for example another 20,000 cubic feet of oxygen, is required as based upon the known flow rate. A final periodic time interval for the oxygen flow is determined after which the oxygen flow is terminated.

By the use of a more continuous metal analysis and sampling device the computer could take even more and frequent readings and determine the temperature of the bath and the carbon content a greater plurality of times. In the use of a metal analysis spectrograph it is necessary to physically remove the sample from the furnace and transport that sample to an associated chemical laboratory for an analysis of the carbon content of the metal sample. By the use of another well-known analyzer the metal analysis can be made more rapidly in that the sample of the metal within the bath is withdrawn from the bath in the furnace and reduced in temperature until it freezes, at which time it is machined down to a constant weight and the analyzer burns the carbon out of this constant weight sample and weighs the carbon gases CO and $CO_2$ and by its own internal mechanism computes how many points of carbon there is in the metal sample. A spectrograph analyzer functions by arcing the removed metal sample, which causes the atoms in the metal sample to be elevated to higher energy states and as they fall back to their normal resting states the atoms release their characteristic wave length radiation which passes through a prism, in the case of an optical spectrometer, to separate into the various wave lengths, and for every element that is to be analyzed the characteristic radiation energy is sensed by one or more photomultiplier tubes which are positioned to monitor the predetermined radiation wave lengths; a current signal for each monitored radiation wave length is produced and the intensity of that signal corresponds to the intensity of the radiation such that in this way a signal is provided in accordance with the percent concentration of the particular monitored element.

There is still another well-known metal sample analysis device which employs the metallurgical fact that the cooling or thermal arrest curve for a metal sample which contains carbon, and the value of the thermal arrest temperature has a close relationship to the carbon content. A very small metal sample from the furnace is taken into a vessel in which there is placed a thermocouple and the output signal from the thermocouple enables the recording of a cooling curve for the metal sample, which curve falls off very fast and goes into what is called a thermal liquid arrest which happens at a temperature related to the carbon content of the metal sample. At the present time this is per se a well-known concept. The latter device permits an analysis of a metal sample in a time period in the order of fifteen or twenty seconds, which enables a rapid determination of the points of carbon within the metal sample. Thusly, this latter device enables a signal to be fed into a computer in accordance with the carbon content of the metal sample taken from the bath within the furnace. From a knowledge of the carbon content, the carbon removal efficiency can be determined, and the present oxygen flow rate which is known enables a determination of how much longer the oxygen flow should continue through the lance into the furnace to obtain the desired target carbon content of the metal bath.

The present invention is a way to make unnecessary the prior art technique of analyzing the exhaust gas from a metal treatment furnace, such as an electric arc furnace and a basic oxygen furnace, and instead analyze the metal bath itself through the process of taking periodic samples of the bath. In the case of a basic oxygen furnace, the metal bath during the oxygen blow period is relatively inaccessible, and secondly it has the problem of chemical stratification while the oxygen flow is turned on. Stratification is a condition of the bath itself, during the very strong oxygen flow rate, of not being of uniform chemical composition such that at any given instant of time a different carbon content reading can be obtained through sampling, depending upon where within the bath the sample is taken. It has been determined that when the oxygen flow is discontinued, an additional time period of twenty or thirty seconds is required for the chemical stratification to disappear within the metal bath.

Figure 3:
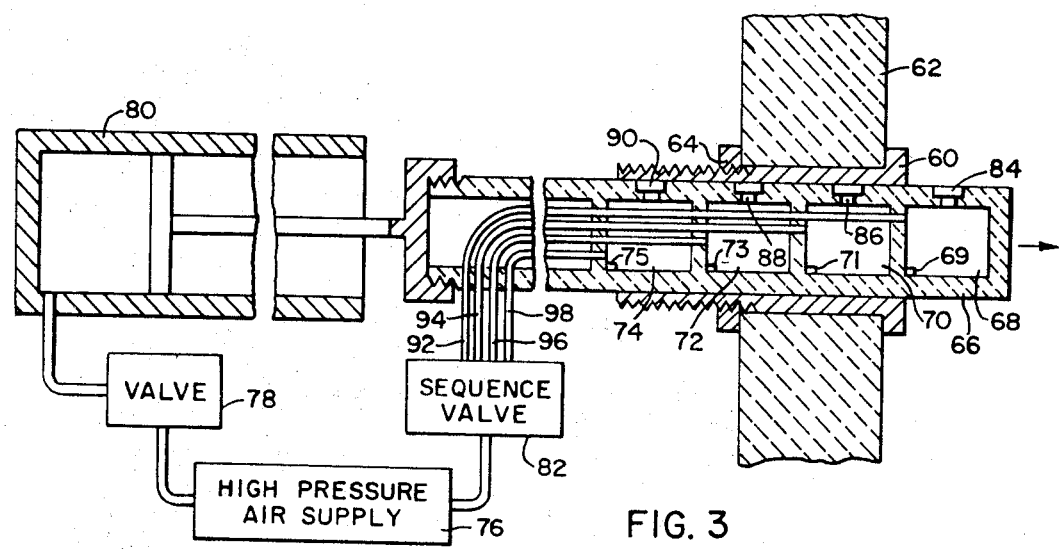
FIG. 3 illustrates one form of a metal sampling device which is suitable for application with an electric arc furnace as well as a basic oxygen metal treatment furnace in conjunction with the control computer of the present invention.

In FIG. 3 there is shown a combined liquid metal carbon content and temperature analyzer which can operate in accordance with well-known steel liquids temperature relationships, and comprises a sleeve member 60 which is firmly held in place in a hole drilled into the lining 62 of the furnace by a nut 64. Axially movable within the sleeve opening of the member 60 is a cylindrical member 66 containing a plurality of compartments 68, 70, 72 and 74. A high pressure air supply 76 is operative through a valve 78 with a cylinder 80 for axially moving the member 66 in a plurality of controlled steps in a direction toward the interior of the electric furnace. A valve 82 is operative with respective conduits connected to the compartments 68, 70, 72 and 74, for individually blowing out a fraction plug contained in each of these compartments. For example, after the valve 78 has been operated to effect a first step movement as shown, the valve 82 has a first position for connecting the high pressure air supply 76 to blow out a friction plug 84 within the compartment 68 to permit liquid metal from the bath within the furnace to enter the compartment 68, including a temperature sensing element 69, where its temperature freezing point measurement can be made. It should be understood that suitable means for removing heat energy from the molten metal sample is provided as necessary to effect the desired solidification of the metal sample taken in this manner. When the valve 78 is operated to make another step movement, the valve 82 has a second position operative to supply high pressure air to the compartment 70 to blow out a plug 86 which permits liquid metal to enter the compartment 70, including a temperature sensing element 71, in a similar manner for carbon content and temperature determination purposes. When the valve 78 is operated to effect another step movement, the valve 82 has a third position for blowing out a plug 88 operative with the compartment 72, including a temperature sensing element 73, and after another step movement the valve 82 has a fourth position for blowing out the plug 90 operative with the compartment 74 including a temperature sensing element 75. The air conduit 92 leads to the compartment 68. The air conduit 94 leads to the compartment 70. The air conduit 96 leads to the compartment 72, and the air conduit 98 leads to the compartment 74.

Figure 4:
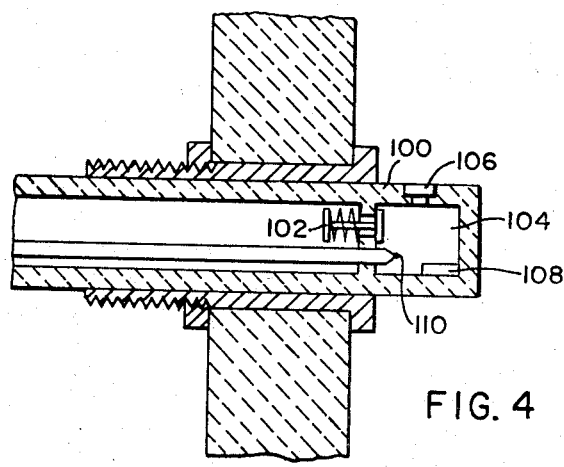
FIG. 4 illustrates a modified form of the metal sampling device shown in FIG. 3.

In FIG. 4 there is shown a modified form of the metal sampling device, wherein the axially movable sleeve 100 is inserted into the metal bath when it is desired to sample the liquid metal within that bath, and a high pressure air supply is connected to the interior of the sleeve 100 to push open a spring biased valve member 102 to open said valve member 102 by the high pressure air supply, which then enters a compartment 104 and blows out a friction plug 106 to permit a sample of the liquid metal to enter the compartment 104. The high pressure air is now removed from the interior of the cylinder 100 such that the valve 102 has closed prior to the liquid metal entering the compartment 104, and the liquid metal is caused to fill the compartment 104. A piece of aluminum 108 is provided to kill the steel entering the compartment 104, and a suitable temperature sensing element such as the thermocouple 110 is provided to sample and monitor the temperature freezing point characteristics of the metal sample within the compartment 104. It is feasible at the present time to determine the carbon content of the metal sample within the compartment 104 in this manner when the sufficient heat energy is removed from the sample to permit analyzing the steel liquidus arrest temperature.

In the case of an arc furnace, if the temperature of the bath is too cold at the end of the oxygen blow period, the arc can be used to heat up the metal bath. In the case of a basic oxygen furnace, the oxygen can be turned on again to heat up the metal bath within the furnace, but the metal chemistry must be watched carefully. For the arc furnace, the control computer can be utilized for power demand control purposes in that if additional metal temperature is required, and a given furnace arc is to be utilized for this purpose, additional electrical power will be required and the scheduling of this furnace power requirement relative to other furnaces is desirable. For example, if electrical power is required for a metal bath that is too cold and the computer can predict that for a particular furnace electrical power will be needed for heating up the metal bath in the next ten minutes or five minutes, the computer can look into the future requirements of the entire plant and determine which furnace has the greatest priority in relation to need of electrical power at any given instant of time. For the purpose of power demand control, most electric furnace users purchase electric power in fifteen-minute periods which are known as demand periods. The total amount of electrical energy bought for a given plant in a given fifteen-minute period is what counts, and the purchaser by contract agrees to a demand limit which if exceeded requires a penalty payment. But there is an incentive to utilize electrical power up to this demand limit. The control computer is provided to monitor the total plant consumption and uses the arc furnaces, which probably require 70% or more of the total power of a given plant, for controlling this power utilization. The computer takes selected arc furnaces and increases the power input depending upon where they are in their cycle of operation. For example, if a given furnace is in the refining period the computer is less likely to vary the power input than if the furnace is in the melting cycle of its operation. The computer monitors and has stored in its memory the operating position of each furnace, and controls the power input to each furnace for the purpose of total plant power demand control. The computer can be operative to predict the length of the oxygen flow period within each of a group of arc furnaces by sampling the metal bath within each such furnace for determining the carbon composition and temperature at sampled intervals of time and in this manner determine when a particular furnace will be ready for and require additional electric power, and can tie together and coordinate the requirements of all the furnaces in a given plant. If the demand limit is about to be or is already reached, the control computer may determine that a given electric furnace will not receive additional power until the total plant load drops enough to permit an increment of power to be supplied to this particular furnace. Further, the computer should be able to predict that in ten minutes a particular furnace will require electric power and this can be considered in conjunction with the power demand requirements of the total plant and entered into the power demand program.

The objective and desired carbon content and temperature of the metal bath within a metal treatment furnace at the end of its treatment period is important since temperature determines the pouring of the metal into ingots, and if the temperature of the metal bath is too high, this is hard on the lining of the furnace, and if the temperature of the bath is too low, there is a chance of the metal freezing before it can be poured into ingots or processed by a continuous casting operation. In addition, high temperature steel generally makes poor ingot surfaces due to splashing of the metal when it is poured into the ingot mold. The carbon content relates to the ability to produce the required specification of the metal as desired by a customer and further the carbon content level determines the ultimate usage to be made of the steel. The higher the carbon content in general the lower the freezing point so a cold bath of metal that has high carbon is generally better than a cold bath of metal with low carbon. A low carbon heat that is too cold is almost certain to freeze.

In accordance with this invention several advantages of the presently realized control of a metal treatment furnace are obtained. First, the remaining oxygen is calculated on the basis of current oxygen efficiency such that historical averages are not used to enable a more accurate following of the actual trends in the oxygen efficiency. Secondly, the sampling periodic time intervals become shorter as the oxygen flow continues, such that the sampling and obtaining of information which is available is more dense toward the end of the blow. Finally, the present control is more simple and less expensive than prior art metal treatment furnace control techniques.

It should be further understood that the devices of FIGS. 3 and 4 are included to illustrate suitable apparatus to take frequent samples from the molten bath within a furnace.

While a preferred embodiment of the present invention has been described, it should be understood that various modifications and changes in the arrangement and operation of parts may be made within the scope and spirit of the present invention.

A temperature sensing device operative with a secondary lance and suitable for use in conjunction with the present metal treatment furnace control is shown in United States Pat. 3,334,520 of T. H. Putman. This device is suitable for operation with either an electric arc furnace or a basic oxyen steelmaking furnace to periodically sense the temperature characteristic of the molten metal bath within the furnace.

We claim as our invention:

1. In apparatus for controlling a metal treatment furnace, the combination of:

metal analysis means operative with at least two samples of the metal within said furance to determine at least the carbon content of each said sample of the molten metal within said furnace, oxygen providing means operative to provide a supply of oxygen to the molten metal within said furnace, and control means operative at a plurality of periodic time intervals in correlation with said metal analysis means to sense the carbon content of a different sample of the metal within said furnace at the end of each said time interval, with said control means being operative with said oxygen providing means for providing any desired additional oxygen to the metal within said furnace after the carbon content of each sample is determined and in accordance with the carbon removal by the oxygen supplied to the metal within said furnace for the preceding time interval.

2. The apparatus of claim 1, with said control means including a programmed digital computer having a memory in which is stored the amount of oxygen supplied to the furnace during each of said periodic time intervals and the amount of carbon removed from the molten metal within said furnace during each of said periodic time intervals, such that the computer can then calculate the carbon removal efficiency for each of said time intervals and determine as desired after each said time interval the amount of additional oxygen needed to effect a desired carbon content in the molten metal within the furnace.

3. The apparatus of claim 1, with
said metal analysis means being inoperative in relation to the end of each said time interval to sample the molten metal from within said furnace and to analyze the metal sample in regard to the actual carbon content of the metal sample.

4. The method of controlling the treatment of molten metal within a furnace, including the steps of
supplying oxygen to react with the molten metal within said furnace for the purpose of removing carbon from said metal,
sensing the carbon content of at least two samples of said molten metal after respective predetermined time intervals that are related to the flow rate of said oxygen,
determining the removal of carbon from said molten metal by said oxygen during said predetermined time intervals,
and controlling the supply of oxygen to react with the molten metal for at least one more predetermined time interval in accordance with the carbon removal of said oxygen during the previous time interval.

5. The method of claim 4,
with said oxygen being supplied to react with the molten metal within said furnace for each of a plurality of time intervals,
each of said time intervals being controlled in accordance with the carbon removal from said molten metal by said oxygen during the preceding time interval.

References Cited

UNITED STATES PATENTS

| | | | |
|---|---|---|---|
| 3,432,288 | 3/1969 | Ardito et al. | 75—60 |
| 3,329,495 | 4/1967 | Ohta et al. | 75—60 |
| 3,372,023 | 3/1968 | Krainer et al. | 75—60 |
| 3,374,088 | 3/1968 | Epstein et al. | 75—60 |
| 3,377,158 | 4/1968 | Meyer et al. | 75—60 |

BERNARD A. GILHEANY, Primary Examiner

R. N. ENVALL, JR., Assistant Examiner

U.S. Cl. X.R.

75—60; 266—34

UNITED STATES PATENT OFFICE
CERTIFICATE OF CORRECTION

Patent No. 3,534,143    Dated October 13, 1970

Inventor(s) N. R. Carlson et al

It is certified that error appears in the above-identified patent and that said Letters Patent are hereby corrected as shown below:

Claim 1, line 53, "furance" should be -- furnace --.
Claim 3, line 8, "inoperative" should be -- operative --.

Signed and sealed this 15th day of June 1971.

(SEAL)
Attest:

EDWARD M. FLETCHER, JR.
Attesting Officer

WILLIAM E. SCHUYLER, JR.
Commissioner of Patents